United States Patent

Koch

[15] 3,659,054

[45] Apr. 25, 1972

[54] SWITCHING ARRANGEMENT FOR TIME MULTIPLEX SYSTEMS HAVING MEANS FOR ELIMINATING SCANNING ERRORS DUE TO CARRIER RESIDUAL VOLTAGES AT THE SCANNING SWITCHES

[72] Inventor: Theodor Koch, Sudetenstrasse 36, 7030 Boblingen, Germany

[22] Filed: Dec. 4, 1969

[21] Appl. No.: 888,190

Related U.S. Application Data

[63] Continuation-in-part of Ser. No. 544,042, Apr. 20, 1966, abandoned.

[30] Foreign Application Priority Data

Apr. 22, 1965 Germany ....................S 96 677
Jan. 21, 1966 Germany ....................S 101 548

[52] U.S. Cl. ....................179/15 A, 179/15 BL
[51] Int. Cl. ....................H04j 3/04
[58] Field of Search ....................179/15 A, 15 LL

[56] References Cited

UNITED STATES PATENTS

| | | | |
|---|---|---|---|
| 3,142,822 | 7/1964 | Martin | 179/15 A |
| 3,248,483 | 4/1966 | Searcy | 179/15 BL |
| 3,258,538 | 6/1966 | Searcy | 179/15 BL |
| 3,350,573 | 10/1967 | Barany | 307/243 |
| 3,427,475 | 2/1969 | Wilkinson | 179/15 BL |

FOREIGN PATENTS OR APPLICATIONS

| | | | |
|---|---|---|---|
| 1,229,156 | 11/1966 | Germany | 179/15 A |

*Primary Examiner*—Kathleen H. Claffy
*Assistant Examiner*—David L. Stewart
*Attorney*—Hill, Sherman, Meroni, Gross & Simpson

[57] ABSTRACT

A switching arrangement for time multiplex systems for eliminating scanning errors due to carrier residue voltages at the scanning switches, particularly where group compandering is employed, employs an additional switch operated with a storer having a high input impedance as compared with the output impedance of the respective signal channels, the additional switch and storer being in series with the respective channels over the individual scanning switches therefor, the additional switch being controlled during the period of the impulse sequence frequency of the pulse frame and is arranged to be actuated from a conducting state to a blocking state prior to the expiration of the closed period of an actuated scanning switch.

6 Claims, 6 Drawing Figures

INVENTOR
Theodor Koch
BY Spiess & Spiess
ATTYS.

INVENTOR
Theodor Koch

BY Stiee & Stiee
ATTYS.

INVENTOR
Theodor Koch
BY Spiess & Spiess
ATTYS.

SWITCHING ARRANGEMENT FOR TIME MULTIPLEX SYSTEMS HAVING MEANS FOR ELIMINATING SCANNING ERRORS DUE TO CARRIER RESIDUAL VOLTAGES AT THE SCANNING SWITCHES

CROSS-REFERENCE TO RELATED APPLICATION

This is a continuation-in-part application of an application of the same title, Ser. No. 544,042, filed Apr. 20, 1966 and assigned to the same assignee, which is now abandoned.

BACKGROUND OF THE INVENTION

1. Field of the Invention

This invention relates to a switching arrangement for the scanning of a plurality of analog signals with subsequent combining of the scanning samples into a pulse frame of a time multiplex system, and more particularly to a switching arrangement for eliminating scanning errors due to carrier residue voltages at the scanning switches.

2. Description of the Prior Art

Heretofore, switching systems of the type described herein utilized a number of electronic switches, each of these switches corresponding to one of a number of signal channels of a time division multiplex system. These switches are opened and closed in accordance with a scanning program to scan the analog signals during the period of the signal scanning frequency of the system. Ordinarily, the samples obtained at the output of the switches are combined into a pulse frame by the provision of a common connection of their outputs. These commonly connected scanning switches are operatively controlled during the period of the signal scanning frequency so that each is opened and closed in a staggered relation of time with respect to one another, in correspondence to the selected scanning sequence of the channels, each channel being scanned, for one period of the impulse sequence frequency of the pulse frame.

As electronic switches are preferably employed, such as switches which utilize semi-conductor elements, for example diodes or transistors, these types of switches would present differences at each channel with respect to the remainder of the channels that cannot be neglected. These differences effect particularly troublesome fluctuations with respect to the conductivity during the switching periods of the switches involved. Of particular importance in this context, however, is the sampling defects of the scanning switches belonging to a channel group, in that a scanning error occurring in all of the scanning switches can be compensated with relatively simple technical provisions, for example, by the introduction of a constant direct voltage for compensation. The scanning errors, designated as carrier residue voltages of the scanning switches, impair the quality of transmission however, i. e., they limit the available control range of the system.

Compandering is often employed to improve the signal/noise ratio in message transmission systems. In compandering, on the transmitting side, the small amplitude signals are amplified to a greater extent than large amplitude signals (compression process) and on the receiving side, the initial signal distortion created by compression is cancelled by a reverse process (expansion process). In order to avail the provision of a compressor for each signal channel at the transmitting side, and an expander at the receiving side, it is appropriate to carry out the compandering at the group level rather than at the channel level. In the case of group compandering, however, especially high demands must be placed on the freedom from carrier residues at the channel scanning switches in that the zero point displacements represented in these carrier residue voltages are to a certain extent amplified by the compander and lead to signal distortions.

SUMMARY OF THE INVENTION

The present invention therefore has as its underlying problem, in a switching system of the type initially described, particularly in a time division multiplex system operating with group compandering, to provide a simple solution satisfying even every high demand with respect to freedom from carrier residues.

The invention proceeds from a switching arrangement for the scanning of a plurality of analog signals from individual channels of a time division multiplex system. In such a system the channels are subsequently grouped into a pulse frame and electronic switches individual to the channels are controlled in the period of the signal scanning frequency with the pulse sequence frequency of the pulse frame, the operation of the electronic switches being accordingly staggered with respect to one another in time by one period of the impulse sequence frequency of the pulse frame. The problem of carrier residue voltages is solved according to the invention by the provision of an arrangement in which the scanning switches, by way of the common output thereof and a further electronic switch, operated with a storer having a high input impedance as compared with the output resistance of the sequence channels. The respective pulses controlling the further electronic switch in the period of the impulse sequence frequency of the pulse frame are so constructed and dimensioned that, in each case, the pulses actuate the further switch prior to the termination of the closed period of a scanning switch from its conducting state into its blocking state.

The invention is based on concept that the carrier residue voltages of the scanning switches can be kept sufficiently independent of the conduction value of the switches if it is possible to cause the current flowing during a scanning process to die out toward zero within the switching interval. In such a case the voltage drops from the pass resistance of the switch, and thereby the carrier residue voltage also becomes practically equal to zero. This requirement is fulfilled in the switching arrangement according to the invention by means whereby the scanning switches operate with a storer that is of a high input impedance as compared to the internal resistance of the signal channels. However, this measure alone is not sufficient to assure the desired high freedom from carrier residues in that during the transition of the scanning switch from its conductive state into its blocking state, switch-dependent falsifications of the scanning samples must be considered. For this reason, in the connection line of the scanning switches to the storer there is also arranged an additional electronic switch which opens at the proper time prior to termination of the closed period of the particular scanning switch and thereby prevents the possibility of a falsification of the scanning sample just then being transmitted to the storer. Advantageously, there is connected in common to the outputs of all the scanning switches, a high resistance leak resistor.

The storer with which the scanning switches operate can, in a simple and advantageous manner, be a charging condenser or capacitor which, in connection with a discharge device, is dimensioned such that with each incoming scanning sample the capacitor is charged briefly to the value of the scanning sample and that in the time interval between two successive scanning samples the capacitor is discharged according to a predetermined time function.

In a preferred embodiment of the invention in a time division multiplex system with group compandering, the charging condenser representing the storer, along with the discharge device, is expanded into a modulation converter which converts the scanning sample into duration-modulated impulses, with the discharge of the charging condenser being controlled by means influencing the time constant of discharge in time dependence with respect to the desired compandering. In this connection, it is expedient to scan the analog signals of the individual channels asymmetrically. For this purpose there is superimposed on the analog signals, at the inputs of the respective scanning switches, a direct voltage common for all the channels of a group, the voltage of which is generated for the automatic zero-value adjustment of the signal voltage by a correspondingly dimensioned and controlled regulating device.

BRIEF DESCRIPTION OF THE DRAWINGS

Other objects, features and advantages of the invention, its organization, construction and operation will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
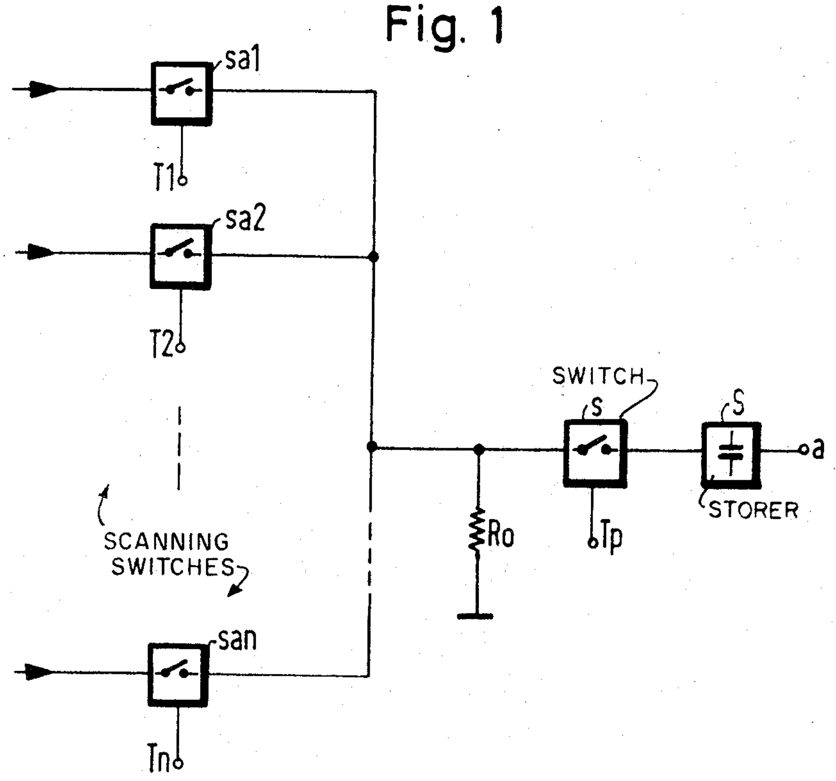
FIG. 1 is a schematic representation of a switching system according to the invention.

The theoretical circuit diagram of a time division multiplex switching system according to FIG. 1, shows *n* scanning switches sa1 to san for *n* signal channels. The outputs of these scanning switches are connected in common with one another and are operative by way of a further switch *s* which is connected to the storer S. FIG. 1 further illustrates the provision of a leak resistor Ro connected in common with the outputs of all of the scanning switches sa1–san. The scanning switches sa1–san are controlled in each case by a pulse sequence T1–Tn, respectively, and the switch *s* is controlled by a pulse sequence $T_p$ as illustrated in FIG. 2.

Figure 2:
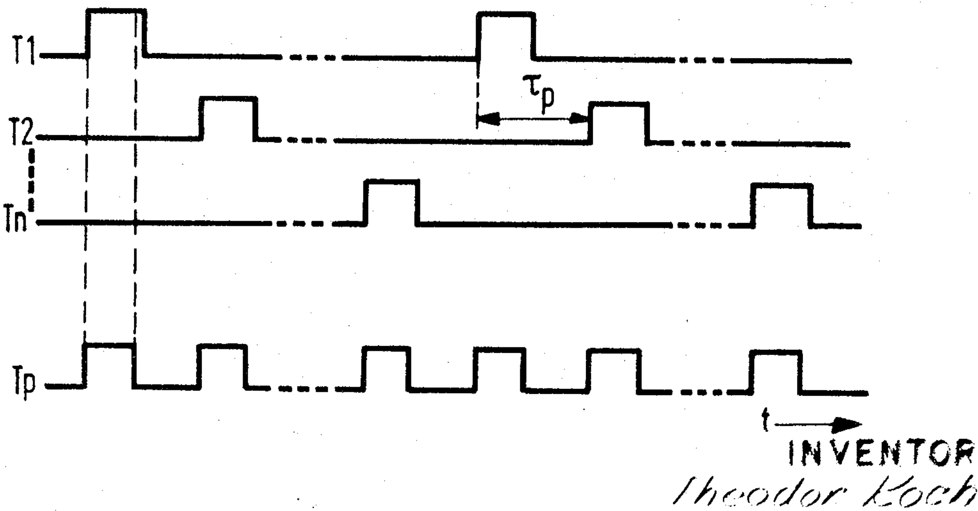
FIG. 2 is a timing diagram of the switching processes accruing in the switching circuit of FIG. 1.

The time relationship of the pulses is represented in FIG. 2. The pulses T1–Tn, which have the same repetition frequency, are, in each case, staggered in time and displaced in phase with respect to one another in the course of their succession, by the time interval from leading edge to leading edge of $\tau p$ so that the scanning samples of the individual signal channels arrive at the input of switch *s* in the period of the interval $\tau p$. The pulses $T_p$ for the switch *s* likewise have the period $\tau p$. The duration of each pulse $T_p$, as is apparent from FIG. 2, is selected to be slightly less than the duration of the impulses of pulse sequences T1–Tn. Here, the time position of the pulse of the sequence $T_p$ to the impulses of the sequences T1–Tn is so selected that their leading edges in each case coincide in time. In this manner it is assured that the switch *s* is always conductive for a time interval that is during and less than the pulse width of the corresponding pulses of the sequences T1–Tn. The leak resistor Ro is of relatively high resistance and serves, as its name already indicates, for the diversion of residual charges which are active at the commonly connected outputs of the scanning switches during the time interval when switch *s* is open. The pulse frame formed from the scanning samples of the individual channels is taken off at the output *a* of storer S, as illustrated in FIG. 1.

As has already been set forth, the switching arrangement according to the invention makes possible a high degreee of freedom from carrier residue of the scanning switches of the individual channels in that the scanning switches actuate a storer having an input impedance which is high as compared with the output impedance of the signal channels and the further switch decouples the storer from the scanning switches at the proper time, before completion of a closed period of a scanning switch. The switch *s* which may be constructed in the same manner as the scanning switches sa1–san has, of course, carrier residue voltages, which carrier residue voltages likewise necessitate compensation. This compensation can be effected, however, with little technical and economic expenditure, in that the error of this switch is communicated in the same manner to the scanning samples of all the channels.

Figure 3:
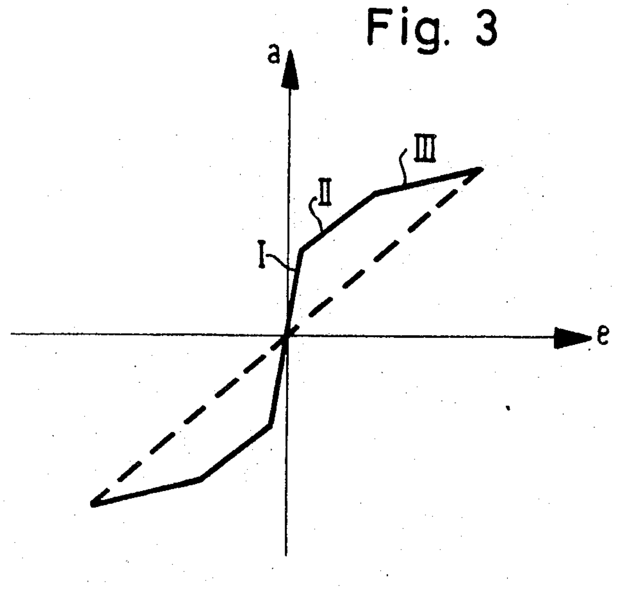
FIG. 3 is a graphical illustration of a compandering characteristic curve.

The primary object of the invention, as has previously been stated, has a special importance with respect to its utilization in a time division multiplex system employing group compandering, in that there are particularly high demands placed on the freedom of the scanning switches from carrier residues. For the explanation of this situation, attention is invited to the illustration of FIG. 3, in which the solidly drawn compandering characteristic curves thereof represent the valuation of the amplitude of the signal to be compandered by the compander. On the abscissa there is plotted the input magnitude *e* and on the ordinate is plotted the output magnitude *a*. The 45° straight-line plotted in the diagram as a broken line represents a linear transition. The compandering characteristic curve according to FIG. 3 is not continuous but is composed of three partial ranges I, II, and III, each individually linear, and mirrored on the zero point of the coordinate system. These ranges differ from one another essentially in their inclination to the abscissa. Here, the partial range I in the area of small amplitudes of the input magnitudes e has the greatest angle of inclination, i.e., in this range the amplitudes of the input magnitude are considerably increased (e.g. 15 times) while, in contrast, the partial range II illustrates the amplitudes of the input magnitude *e* which are transferred practically unaltered into the output magnitude *a*. The outer partial range III has, with respect to the abscissa, an angle of inclination which is considerably smaller than 45°. In this range, therefore, the amplitudes are compressed.

As a rule, the amplitude range in which the partial range I of the compandered characteristic curve is effective amounts to only a fraction of a percent of the maximum amplitude of the input signal. The correct evaluation of the input value by the compander is, accordingly, sufficiently assured only when the carrier residue voltages of the scanning switches are considerably smaller than that of the amplitude range corresponding to partial range I. In practice, this means that the carrier residue voltages may be, at the maximum, in the order of magnitude of from 0.1 to 0.2 percent of the total signal amplitude range.

Figure 4:
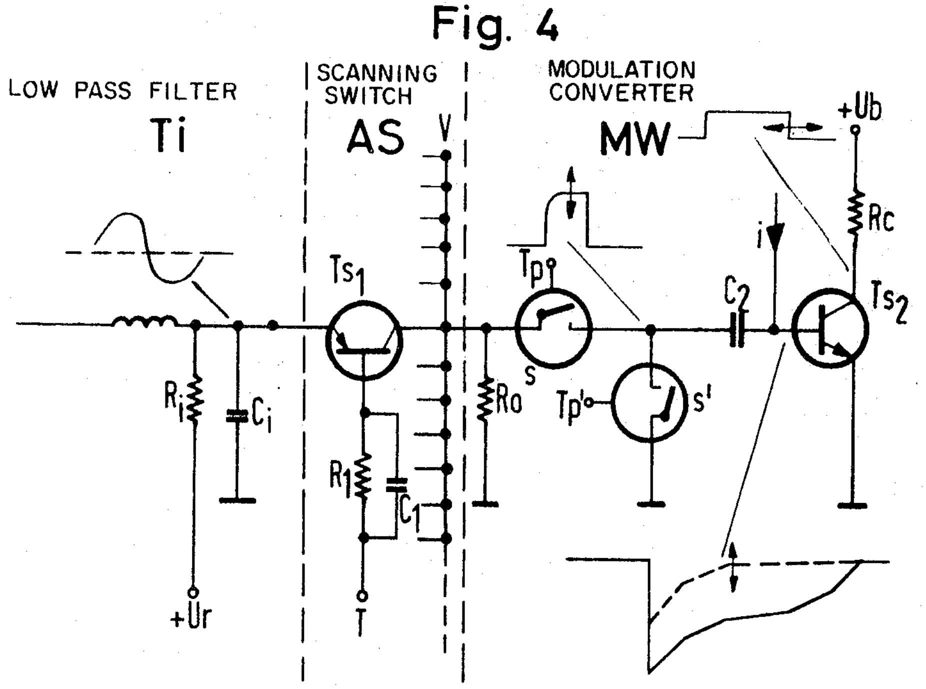
FIG. 4 is a switching diagram of a switching arrangement employing a group compander according to the present invention.

In FIG. 4 there is illustrated an example of construction of a switching system according to the invention which is cooperable with a group compander. The group compander is here designed for 30 channels, of which there is illustrated only one incoming channel, with a separate scanning switch connected thereto and the other twenty-nine channels, with their scanning switches, being schematically represented by the multiple V. The signal energy transmitted in the operation of a signal channel is thus fed from the output of the low pass filter Ti allocated to the channel involved over a scanning switch AS to a modulation converter MW including the group compander. The modulation converter, considering the desired compandering, converts the scanning samples taken from the storer into duration-modulated pulses. The low pass filter Ti is connected at its output terminal with the capacitor Ci on which is carried the signal voltage to be scanned. In order to make possible an asymmetrical control of the scanning switches, the capacitor Ci of each low pass filter is provided with the direct voltage +Ur over a resistor Ri which represents the zero potential for the alternating signal voltage.

The scanning switch illustrated in FIG. 4 comprises a transistor Ts1, having a base to which is applied the control pulse sequence T over the parallel circuit of the resistor R1 and the capacitor C1. Corresponding to the theoretical circuit diagram of FIG. 1, there is connected in common with the output of all of the scanning switches, i.e., at the multiple V, the leak resistor Ro. All the scanning switches likewise operate, over the additional switch *s*, on the charging condenser C2 representing the storer S of FIG. 1. The other terminal of the charging condenser C2 in FIG. 4 is connected to the base of the transistor Ts2 whose emitter is connected to a reference potential ground and whose collector is connected to the operating direct voltage +Ub by way of the collector resistor Rc. At the junction of the switch *s* and the charging condenser C2 there is connected one side of a switch *s'* the other side of which is connected to a reference potential ground. The switch $s'$ effects the discharge of the charging condenser C2 following the completion of the charging cycle, and is controlled for this purpose by a control pulse sequence $T_p'$ having the same sequence frequency as the control pulse sequence $T_p$ for the switch $s'$, but complementary thereto, i.e., the switch $s'$ is closed when the switch $s$ is open, and vice versa. Connected to the junction of the charging capacitor C2 and the base of transistor Ts2 is still another current supply of $i$ from which the charging capacitor C2 is discharged during the time intervals in which the switch $s'$ is closed. The time constant of this circuit is controlled time dependently in accordance with the desired compandering, by means not shown in detail in FIG. 4.

The charging condenser C2, together with the transistor Ts2 and the switch $s'$, forms a monostable multivibrator stage in which the transistor Ts2 is conducting in the rest state. The conversion of the scanning samples into duration-modulated pulses by means of this monostable multivibrator stage is accomplished by the discharging of the charging condenser C2. This operation is effected when the condenser C2 is rapidly charged by a scanning sample supplied by way of switch s to its amplitude value over the conductive base emitter circuit of the transistor Ts2 and thereupon is discharged by way of the closed switch $s'$ and the current supply $i$. During the discharge of the charging condenser C2, the potential at the base of the transistor Ts2 is reversed so that during this discharge process the transistor is shifted from its conducting condition into its blocked condition, the voltage appearing at the base being represented in FIG. 4. In a transformation without compandering, the voltage there appearing presents a linear sawtooth with a negative amplitude. In the present case, the trailing edge of this sawtooth, however, has an s-shaped course corresponding to the compandering characteristic curve according to FIG. 3 but this time represented in the time domain. In a similar manner there are represented in FIG. 4 the continuous signal voltage appearing across the capacitor $C_i$ of the low pass filter Ti, the scanning impulse transmitted to the charging condenser C2 over the switch $s$ and the duration-modulated impulse appearing at the collector of transistor Ts2.

If the duration-modulated pulses at the output of the transistor Ts2 are to be converted into the usual binary code, under application of the so-called counting process with the aid of a start-stop generator and of a binary counter, for example, the binary counter can be co-utilized in connection with a logic control system for effecting control of the time constant of the discharge circuit associated with the charging condenser C2 in accordance with the desired compandering.

The balancing of the carrier residue error impressed through switch s on the scanning samples of all 30 channels in the same manner, is expediently and advantageously achieved by the provision of the direct voltage +Ur, determining the zero position of the asymmetrically scanned signal, this voltage being regulated in a suitable manner.

In many applications the high impedance quality of the storer, necessary for operation of the switching system without the carrier residue, with respect to the internal resistance of the signal channels, cannot be directly fulfilled. In a further development of the invention, it is therefore proposed that the high input impedance of the storer, with respect to the output resistance of the signal channels, be realized by the provision of an impedance converter inserted therewith into the circuit.

In a preferred example of construction, the impedance converter is included with the further electronic switch which is also connected in circuit with the storer, by the provision of the impedance converter and the switch as a switching amplifier.

Figures 5, 6:
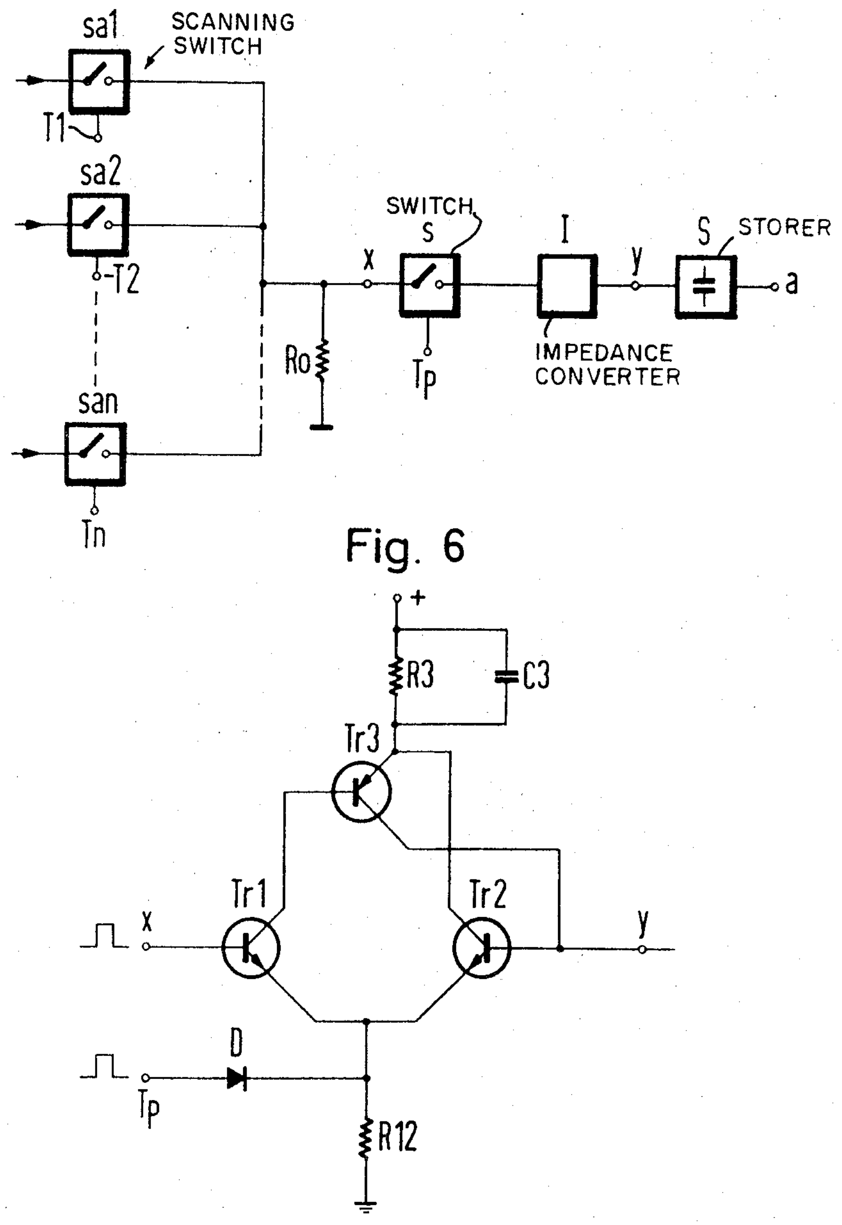
FIG. 5 is a schematic representation of a further development according to the invention.
FIG. 6 is a switch and amplifier according to the invention.

FIG. 5 also illustrates the $n$ number of scanning switches sa1–san for $n$ signal channels which are connected in common with one another at their outputs. To the output of all of the scanning switches which is connected in common a leak resistor Ro, there is connected the further electronic switch s having an input, referenced x. The output of the switch is connected to the impedance converter I, the output being referenced $y$. The impedance converter I is connected to the input of the storer S. The output of the storer S is again designated as $a$. The scanning switches sa1–san, as previously mentioned, are operatively controlled in each instance by a pulse sequence T1–Tn, and the further switch s is operatively controlled by the pulse sequence $T_p$. The pulse sequences T1–Tn all have a frequency corresponding to the sequence frequency of the successively following pulse frames, and in each case are displaced in time with respect to one another by one period of the pulse sequence frequency of a pulse frame. The pulse sequence $T_p$ for the further switch $s$ agrees with respect to its frequency with the pulse sequence frequency of one pulse frame. If the time relation of the pulses of sequence $T_p$ to the pulses of the sequences T1–Tn is selected so that their leading edges coincide in time, the duration of the pulses of sequence $T_p$ should be slightly shorter than the duration of the pulses of sequences T1–Tn, to assure that the switch-dependent interference voltages, which occur in the transition of a scanning switch from the conducting state to the blocking state, cannot pass into the storer S.

The impedance converter I, according to the invention, which is connected in circuit with the storer S, makes it possible to accomplish the high resistance connection of the storer necessary for the carrier residue-free operation of the switching system in a relatively simple manner, even if the storer itself does not fulfill the requirement mentioned with respect to its input impedance.

The impedance converter I is preferably integrally combined with the further switch s as a unitary circuit by a circuit arrangement in which the switch $s$ and the converter I are constructed as a switched amplifier. An advantageous form of construction for such a switched amplifier is illustrated in FIG. 6, in which its input and output are designated, in correspondence with the input of the switch $s$ and the output of the impedance converter I illustrated in FIG. 5, as $x$ and $y$. It comprises three transistors Tr1, Tr2, and Tr3. The transistors Tr1 and Tr2 represent a differential amplifier. For this purpose, the emitter electrodes of these two transistors are connected by way of a common emitter resistor R12 to a reference potential. The base electrode of transistor Tr1 forms the input $x$ of the switched amplifier and the base electrode of transistor Tr2, together with the collector electrode of transistor Tr3, represents the output $y$. The base electrode of the transistor Tr3 is connected to the collector electrode of the transistor Tr1 and its emitter electrode is connected over the emitter resistor R3, bridged by the capacitor C3 in an alternating current manner, to a positive direct voltage. The same is also true of the collector electrode of the transistor Tr2 which is connected to the emitter electrode of transistor Tr3. The control pulse sequence $T_p$ is supplied to the switched amplifier by way of a diode D to the junction of emitter resistor R12 and emitters of transistors Tr1 and Tr2. In operation, and assuming that the storer connected to output y has just been discharged for the reception of an incoming signal pulse, the base electrode of transistor Tr2 has thereon a correspondingly low potential, and a positive signal pulse appears at the input $x$. Therefore, the transistor Tr1 is rendered conductive and simultaneously blocks the transistor Tr2. The transistor Tr1 controls the output of the stage through the transistor Tr3, which in turn conducts the signal pulse over its collector and the output $y$ to the storer S. As long as the storer S, and thereby the potential on output $y$, does not reach the potential of the impulse appearing at input $x$, this state remains preserved. As soon as the storer is charged, the transistor Tr2 becomes conductive and in so doing takes over, with its own base, the collector current of transistor Tr3. Because of the effective current amplification factors of the transistors, the transistor Tr2 is controlled to be conducted far into its conducting state, while the base current of the transistor Tr1 dies out in a desired manner to a negligibly small value, i.e., toward zero. Shortly before completion of the input signal impulse, the switched amplifier is blocked by an incoming positive pulse of sequence $T_p$ applied to the emitters of transistors Tr1 and Tr2.

The blocking effect results from the provision of the pulse over the diode D which at the emitter resistor R12 raises potential of the emitters of the transistors Tr1 and Tr2 sufficiently in the positive direction that both transistors are conditioned sufficiently far into their blocking ranges.

I claim as my invention:

1. A time division multiplex switching system in which is generated a plurality of first control pulses respectively representing a plurality of time positions and a second control pulse train of which each individual pulse corresponds to the time position of one of the first control pulses and is of less duration than that of the first control pulse, said switching system comprising:

a plurality of signal channels for receiving analog signals, a plurality of first switches each corresponding to a separate one of said channels and all individually operated in response to corresponding ones of said first control pulses, a storer commonly associated with said plurality of signal channels and said plurality of first switches and having an input impedance which is relatively high compared to the output impedance of said signal channels, a resistor having a resistance which is high compared with the output resistance of said signal channels connected in common to said plurality of first switches and connected to a reference potential, and a second switch connected between the common connection of said plurality of first switches and resistor and said storer and operated during each time position in response to said second control pulse to prevent residue voltages of said channels from being transmitted to said storer.

2. A time division multiplex switching system according to claim 1, wherein said storer comprises a charging condenser for charging to the value of the scanning sample, and a shunt device operated in the time interval between two successive scanning samples to discharge said condenser according to a predetermined time function.

3. A time division multiplex switching system according to claim 2, for group compandering comprising a modulation converter including a group compandering control current input and said storer and connecting said plurality of first switches to said storer for converting the samples into duration-modulated impulses, the discharge of said charging condenser being controlled in dependence on time according to the current supplied to said compandering control current input.

4. A time division multiplex switching system according to claim 3, comprising means for superimposing a direct voltage, common to all of said channels, on the analog signals at the inputs of the respective first switches to provide for asymmetrical control of said first switches for scanning of said channels.

5. A time division multiplex switching system according to claim 1, comprising an impedance converter connected between said second switch and said high input impedance storer.

6. A time division multiplex switching system according to claim 1, comprising a switched amplifier which includes an impedance converter and said second switch, said switched amplifier having an input connected to said plurality of signal channels, an output connected to said storer, and a switching input for receiving a second control pulse for controlling the operation of said second switch thereof.

* * * * *